Aug. 13, 1968  A. M. SAMUELS ET AL  3,396,604
FAUCET HANDLE ASSEMBLY
Filed April 25, 1966
FIG. 1
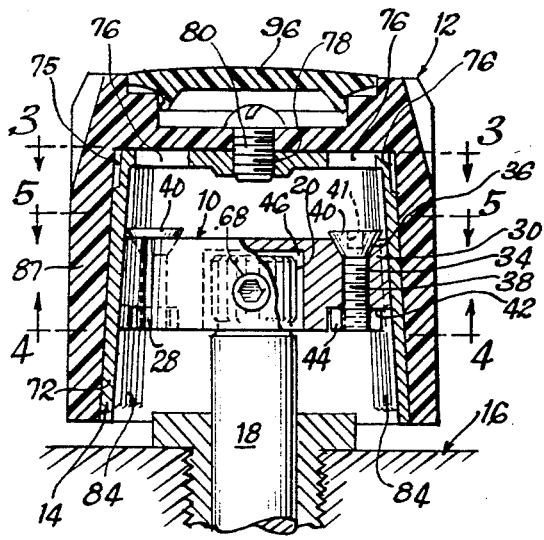
FIG. 2
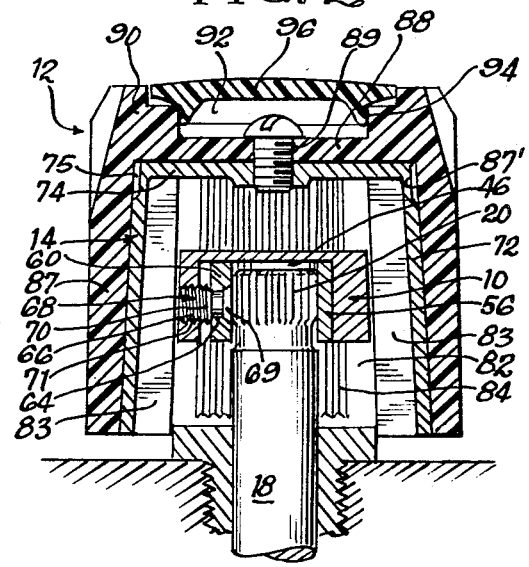
FIG. 3
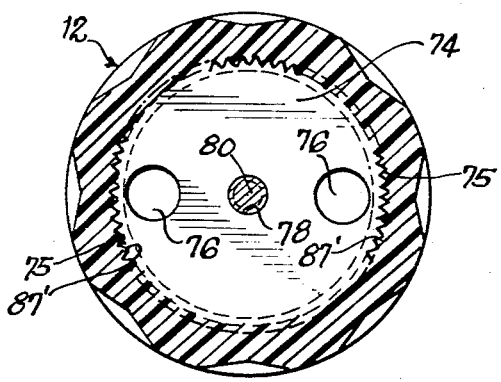
FIG. 4
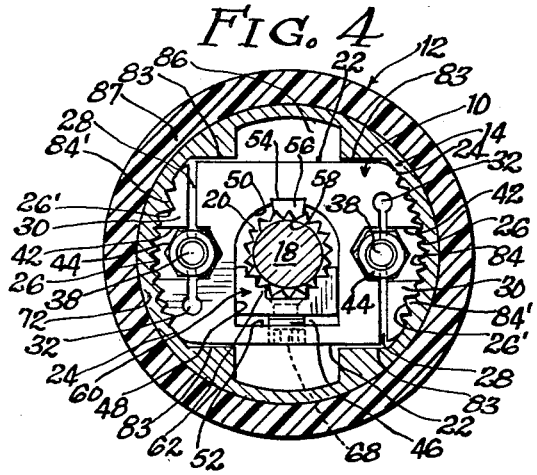
FIG. 5
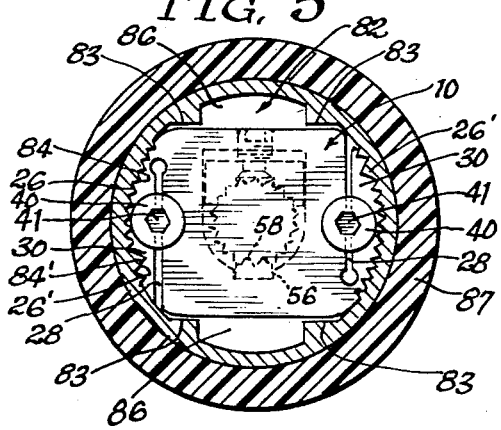
FIG. 6
INVENTORS
Abraham M. Samuels
Eugene B. Shapiro
Max R. Kraus Att'y United States Patent Office 3,396,604
Patented Aug. 13, 1968

3,396,604
FAUCET HANDLE ASSEMBLY
Abraham M. Samuels, Chicago, and Eugene B. Shapiro, Highland Park, Ill., assignors to Chicago Specialty Manufacturing Co., a corporation of Illinois
Filed Apr. 25, 1966, Ser. No. 545,130
9 Claims. (Cl. 74—548)

ABSTRACT OF THE DISCLOSURE

A holder has inner clamp means which attaches the holder to a faucet stem. The holder has outer clamp means which attaches a handle body to the holder.

---

This invention relates to a faucet handle assembly.

One of the objects of this invention is to provide a replaceable faucet handle which may be readily and easily applied to a faucet stem by an inexperienced person.

Due to the different lengths of faucet stems a problem is presented of providing a simple replaceable faucet handle which will fit or be accommodated on the different length stems of faucets. One of the objects of this invention is to provide a single faucet assembly which is universally adaptable for securement to any faucet stem and wherein same may be easily and readily applied by an inexperienced person.

Another object of this invention is to provide a faucet handle assembly which has means secured to the faucet stem which permits the handle to be moved axially with respect to said means to any desired position and to be locked in such adjusted position.

Another object of this invention is to provide a faucet handle assembly comprising a holder attachable to the faucet stem, and an insert for securement inside the faucet handle, with said insert movable axially with respect to the holder so that the insert is adjusted and held in its axially moving position to thereby support the handle.

Another object of this invention is to provide a faucet handle which may also be used in initial installations.

Other objects will become apparent as this description progresses.

In the drawings:

FIG. 1 is a central vertical cross-sectional view of the faucet handle assembly forming this invention.

FIG. 2 is a sectional view taken at right angles from that of FIG. 1.

FIG. 3 is a sectional view taken on line 3—3 of FIG. 1.

FIG. 4 is a sectional view taken on line 4—4 of FIG. 1.

FIG. 5 is a sectional view taken on line 5—5 of FIG. 1, and

FIG. 6 is a sectional view of a modification.

The handle assembly shown in FIGS. 1 to 5 inclusive, is formed essentially of three main components, namely, a holder, generally indicated at 10, a handle body, generally indicated at 12, and an insert, generally indicated at 14. The insert 14 fits within the handle body and is secured thereto. The holder 10 is first secured to the faucet stem. The insert 14 prior to its attachment to the handle body 12 is axially movable relative to the holder 10 to any desired adjusted position, at which position it is locked to the holder.

The faucet generally indicated at 16 has a conventional faucet stem 18 which has a fluted upper end 20. The holder 10 is secured to the fluted end 20 of the stem. The holder, which is preferably die cast, is shaped in plan, as best shown in FIGS. 4 and 5, and has spaced sides 22 parallel to each other and arcuate-shaped opposite ends 24. The arcuate-shaped ends 24 are each provided with vertically extending grooves or teeth 26, with one of the teeth or grooves being recessed as at 26′ for registry with an enlarged tooth on the insert 14.

The holder 10 has a pair of spaced transversely extending slots 28, each slot positioned inwardly of the arcuate-shaped ends and each slot extending substantially three-fourths of the width of the holder. The slots 28 are parallel to each other but each extends through and terminates at the opposite sides 22 of the holder. One of the slots 28 extends to one side 22 while the other slot 28 extends to the opposite side 22. The slots 28 provide the holder with the opposite end segments 30, as will be subsequently explained, which are caused to spread or move outwardly laterally sufficiently to effect a locking of the insert 14. The grooves or teeth 26 are in the end segments 30.

Each slot 28 has its inner end terminating in an enlarged annular portion 32. Each slot has an unthreaded vertical bore 34 which intersects the slot, with the upper end of the vertical bore chamfered as at 36. Each bore 34 receives a threaded screw 38 having a tapered head 40, which head is positioned in the chamfered upper portion 36 of the bore 34. The top of the head 40 is flat and has a recess 41 to accommodate a tool for rotating the screw.

The underside of the holder 10 (best shown in FIGS. 1 and 4) under each bore 34 is recessed as at 42 to accommodate an hexagonal nut 44 which is prevented from turning or rotating in its respective recess 42 by the walls of the recess. Each nut 44 receives the lower end of the screw 38.

The underside of the holder 10 is centrally recessed to provide a socket, generally indicated at 46, for receiving the fluted end 20 of the stem 18. The shape of the socket 46 in plan is best shown in FIG. 4. It comprises spaced linear side walls 48 connected at one end by an arcuate wall 50. The opposite end wall 52 is linear. The arcuate end wall 50 of the socket 46 is further recessed as at 54 to accommodate a fixed stationary clamping jaw 56. The face of the stationary jaw has teeth or grooves 58 to engage the fluted end 20 of the faucet stem 18. The opposite end of the socket 46 receives a movable clamping jaw 60, the face of which is provided with teeth or grooves 62 to engage the flutes 20 of the faucet stem. The movable clamping jaw 60 has a transverse opening 64 which accommodates the short stem 66 of the locking screw 68. The stem has an enlarged head 69 to retain the locking screw 68 affixed to the movable jaw member 60 but permits rotation of the locking screw 68. The shank 70 of the locking screw is threaded to engage the threaded opening 71 in the holder 10. The exterior end of the shank is recessed to receive a tool for rotating same.

As the locking screw 68 is rotated it advances or retracts inside the threaded opening 71 and correspondingly advances or retracts movable jaw member 60 in the socket in relation to the fluted end 20 of the faucet stem 18 to grip or release the fluted end 20 of the stem. When the movable jaw 60 engages the fluted end 20 of the stem both the stationary jaw 56 and the movable jaw 60 will be engaging the holder and the holder 10 will be locked to the faucet stem 18.

The insert or shell 14 is formed preferably of metal. It has an annular wall 72 which is slightly inclined inwardly from the bottom to the top and has a top wall 74 provided with spaced openings 76. The top wall has a centrally positioned internally threaded opening 78 to accommodate the retaining screw 80 which secures the handle body 12 to the shell or insert 14. The annular wall 72 of the shell or insert 14 has teeth 75 at its upper end to engage the teeth on the inside of the handle body 12.

The inside of the insert or shell 14 is shaped to form a socket generally indicated at 82, which socket comprises spaced opposite linear side walls 83 which extend to the annular wall. The inside of the annular wall 72 between the side walls 83 has vertically extending grooves or teeth 84 so that the insert 14 may be positioned over the holder 10 with the teeth 84 of the insert or shell 14 engaging the teeth or grooves 26 on the ends of the holder 10. One of the teeth is enlarged as at 84' for registry with the recessed tooth 26' on the insert 14. This facilitates registry between the insert 14 and the holder 10. The opposite sides 22 of the holder 10 engages the opposite sides 83 of the shell or insert 14. An intermediate recess 86 is provided in each of the sides 83 of the socket 82 of the shell or insert 14 to allow for movement of the locking screw 68 of the holder.

The insert 14 when positioned on the holder 10 is axially slidable with respect to the faucet stem 18 and the holder 10. Thus, the insert 14 may be moved up or down in relation thereto until the desired position is obtained. The insert or shell 14 is then locked relative to the holder 10 by inserting a screwdriver or the like through the top openings 76 of the shell or insert 14 and rotating the screw 38 inwardly, which will cause the flared head 40 of the screw to move against the chamfered surface 36 and push the end segments 30 of the holder outwardly sufficiently for the teeth 26 of the segments to engage the teeth 84 in the shell or insert 14, with the shell or insert 14 becoming locked to the holder 10.

The handle body 12, as shown, is in the form of a knob. It may be formed of a Lucite or other material and it may be transparent. It has an annular wall 87 tapering complementary to the taper of the insert or shell 14. The upper end of the inside of the handle body has teeth 87' adapted to engage the teeth 75 on the insert 14 to lock the handle body to the insert and prevent relative rotation therebetween. The handle body has a top wall 88 provided with a central opening 89 to accommodate the retaining screw 80 which engages the central threaded opening 78 in the insert 14 to secure the handle body 12 to the insert.

Extending upwardly of the top wall is an annular raised portion 90 provided with a recessed area 92 having an annular step configuration 94. A button or closure 96 is snap-fitted into said raised portion 90 to enclose the recessed area and cover the retaining screw 80. The button 96 may be readily removed by a tool which pries it out of position.

The aforementioned construction is adapted for replacement handles, however, it may be used for initially installed handles. In forming initially installed handles, the insert or shell 14 may be eliminated if desired, and the interior of the handle body is shaped to conform to the shape of the interior of the insert. FIG. 6 shows such a modified construction. The interior of the handle body 12 is shaped to provide sides 83' and the opposite inner walls of the handle body are provided with teeth 84' which are like the teeth 84 of the insert 14. The holder 10 is as previously described, with the teeth 26 of the holder engaging the teeth 84' of the handle body. In this manner the handle body 12' may be attached directly to the holder 10 without the insert. In such a construction the top of the handle body is provided with openings similar to openings 76 in the insert so that a tool can be inserted through the said openings to rotate the screw 38 and spread the end segments 30 of the holder so that the teeth of the end segments engage the teeth 84' of the handle body. The handle body 12' is axially movable with respect to the holder 10.

There is thus provided an inexpensive handle assembly which is universally adaptable as a replacement to any faucet stem and may be applied by an inexperienced person. It may also be used in initial installations.

It will be understood that various changes and modifications may be made from the foregoing without departing from the spirit and scope of the appended claims.

What is claimed is:
1. A handle assembly for faucets or the like comprising, a holder, said holder having means for attachment to a faucet stem, said holder provided with a pair of slots which define an end segment at each of the opposite ends of the holder, means which are manually rotatable within said slots to cause the end segments to spread outwardly, a handle body fitting over said holder, said handle body having means engageable by said end segments when the segments are spread outwardly to secure said handle body to said holder in any adjusted position.

2. A structure defined in claim 1 in which the end segments have teeth which engage teeth on the inside of the handle body.

3. A structure defined in claim 1 in which the end segment of the holder is formed by a slot extending through a portion of the holder and in which the end segment has teeth engaging the inside wall of the handle body.

4. A handle assembly for faucets or the like comprising, a holder, said holder having means for attachment to a faucet stem, said holder having a pair of end segments, one at each of the opposite ends of the holder, means cooperating with each of said end segments to cause said end segments to spread or move outwardly, teeth on said end segments, a handle body fitting over said holder, the inside of said handle body having means engageable by the teeth of said segments to secure said handle body to said holder in any adjusted position.

5. A handle assembly for faucets or the like comprising, a holder, said holder having means for attachment to a faucet stem, said holder having an end segment which may be moved outwardly, said end segment having teeth, a handle body fitting over said holder, an insert positioned inside said handle body, said insert having inwardly extending teeth engageable by the teeth of the end segment to secure said handle body to said holder in any adjusted position.

6. A structure defined in claim 5 in which the holder has a central socket with gripping jaws in said socket to engage the faucet stem.

7. A structure defined in claim 5 in which the insert is axially movable with respect to the holder.

8. A handle assembly for faucets or the like in which the faucet stem has a fluted end at its upper end comprising, a holder having a central socket positioned to engage the fluted stem and means to lock said holder relative to said stem, a handle body, an insert consisting of a shell-like member having an annular side wall and a top wall provided with an opening, said insert being manually axially movable relative to the holder to a desired adjusted position, said holder having vertically extending manually rotatable means engageable from above the top of the holder through the opening in the top wall of the insert for rotating said means for expanding said holder laterally to engage the insert and hold the insert in its adjusted position, said handle body positioned over said insert to enclose said insert when said insert is in its locked adjusted position, and means extending through the top of said handle body and engaging the top wall of said insert for securing the handle body to said insert.

9. A structure defined in claim 8 in which the side wall of the insert inclines inwardly from the bottom to the top of the insert.

References Cited

UNITED STATES PATENTS

| | | | |
|---|---|---|---|
| 283,380 | 8/1883 | Cooper | 292—347 |
| 2,654,621 | 10/1953 | Wister | 287—53 |
| 3,250,148 | 5/1966 | Soles | 74—553 |

MILTON KAUFMAN, *Primary Examiner.*